Jan. 20, 1970  C. C. AVERY  3,490,776
FLUID GASKET SEAL
Filed Nov. 1, 1967

United States Patent Office 3,490,776
Patented Jan. 20, 1970

3,490,776
FLUID GASKET SEAL
Charles C. Avery, Closter, N.J., assignor to Cresskill-Stillman Rubber Corp., Englewood, N.J.
Filed Nov. 1, 1967, Ser. No. 679,742
Int. Cl. F16j 15/02, 15/00
U.S. Cl. 277—180                       1 Claim

ABSTRACT OF THE DISCLOSURE

A fluid gasket seal including resilient ribs which distort in such manner as to resist cyclic pressure changes existing on either side of the deformable part.

---

This invention relates generally to the field of fluid gasket seals of a type incorporating a relatively rigid gasket element having a recess therein, and a fluid sealing element positioned within said recess in such manner as to partially extend outwardly thereof, said sealing element being deformed upon engagement with a surface to be sealed.

Devices of this type have wide application in effecting a seal between the abutting planar surfaces of metallic bodies, such as housings, pipe flanges and the like. The use of such devices provides a convenient means of installation of a seal, and the rigid housing prevents excess tightening upon the seal to damage the same. Unfortunately, many such sealing devices are installed in locations wherein continuous cyclic pressure changes occur, and each such change when transmitted to the fluid sealing element tends to distort the same in a direction parallel to the plane of the abutting surfaces, causing fatigue of the sealing material, and, in time, ultimate failure.

It is therefore among the principal objects of the present invention to provide an improved fluid gasket seal of the type described, in which the above mentioned disadvantage has been substantially eliminated.

Another object of the invention lies in the provision of an improved fluid gasket seal in which the sealing elements thereof may be conveniently molded in situ, without difficulty in withdrawing the molding surface therefrom.

Another object of the invention lies in the provision of an improved fluid gasket seal which is symmetrical in configuration, and adapted to withstand positive or negative pressure differentials internally or externally of the surfaces being sealed.

A further object of the invention lies in the provision of an improved fluid gasket seal possessed of the above advantages, in which the cost of fabrication may be of a reasonably low order, directly comparable with existing prior art devices, thereby permitting consequent wide sale, distribution and use.

A feature of the disclosed embodiment lies in the contouring of the fluid sealing element to enable the same to more adequately resist the distorting effects of pressure differentials occurring during use.

Another feature of the invention lies in the relatively large area of the sealing element which is placed in contact with the surface to be sealed upon the distortion thereof.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
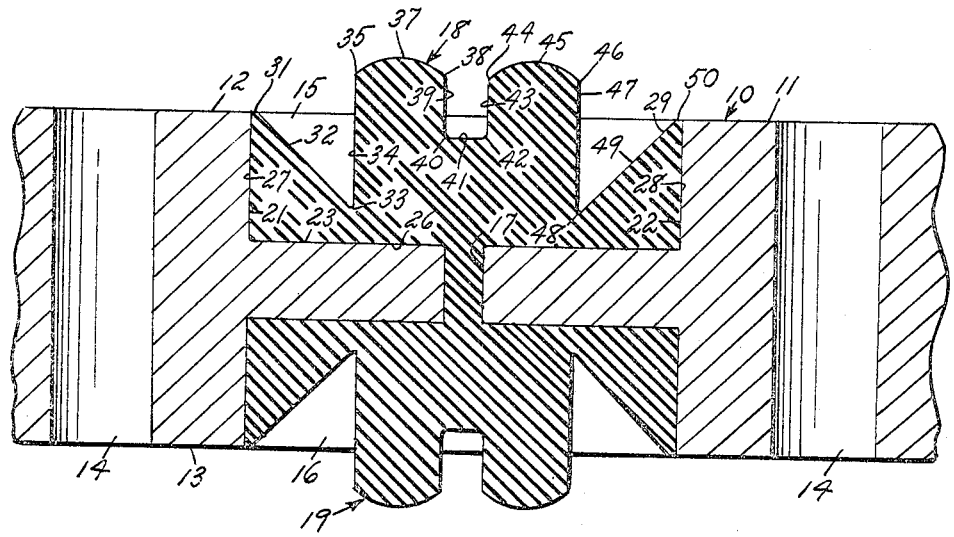
FIGURE 1 is a fragmentary sectional view of an embodiment of the invention.

In accordance with the invention, the device, generally indicated by reference character 10, includes a rigid gasket element 11, the precise configuration of which will depend upon that of the surfaces (not shown) to be sealed, and bounded by first and second planar surfaces 12 and 13, respectively. As is known in the art, the element 11 may include a plurality of parallel bores 14 for the passage of threaded means 20 for maintaining the device in position, and a pair of oppositely disposed continuous recesses 15 and 16, interconnected at periodic intervals by passages 17. Disposed within the recesses 15 and 16, are fluid sealing elements 18 and 19, respectively.

The recesses 15 and 16 are similar, each being bounded by a pair of side walls 21 and 22, and a bottom wall 23 which form a rectangularly shaped volume for the accommodation of the elements 18–19.

The elements 18–19 are similar, and, as is known in the art, are preferably molded in situ to be bounded by an inner surface 26, side surfaces 27 and 28, and an exposed deformable surface 29.

As best seen in FIGURE 1 in the drawing, the surface 29 commences at a side edge 31, and serially interconnects with an angularly disposed wall 32 which terminates in an outwardly facing small curved surface 33. The surface 33 interconnects with a planar surface 34 parallel to the surface 27, the surface 34 extending outwardly of the recess 15, and meeting at an upper edge 35 with a concave outwardly facing surface 37. The surface 37 interconnects at a second edge 38 with a second planar surface 39, parallel to the surface 34 and interconnecting at its lower edge with a radius 40 leading to a planar surface 41 parallel to and positioned below the surface 12. The surface 41 interconnects with a radius 42 to a planar surface 43 parallel to and symmetrically positioned with respect to the surface 39. The surface 43 terminates at an upper edge 44 with a second concave surface 45 symmetrical with the surface 37, and terminating at an edge 46 to interconnect with a planar surface 47, coextensive with and parallel to the surface 34. The surface 47 terminates in a radius 48 leading to an angularly disposed surface 49 symmetrically positioned with respect to the surface 32, to terminate at an edge 50.

Figure 2:
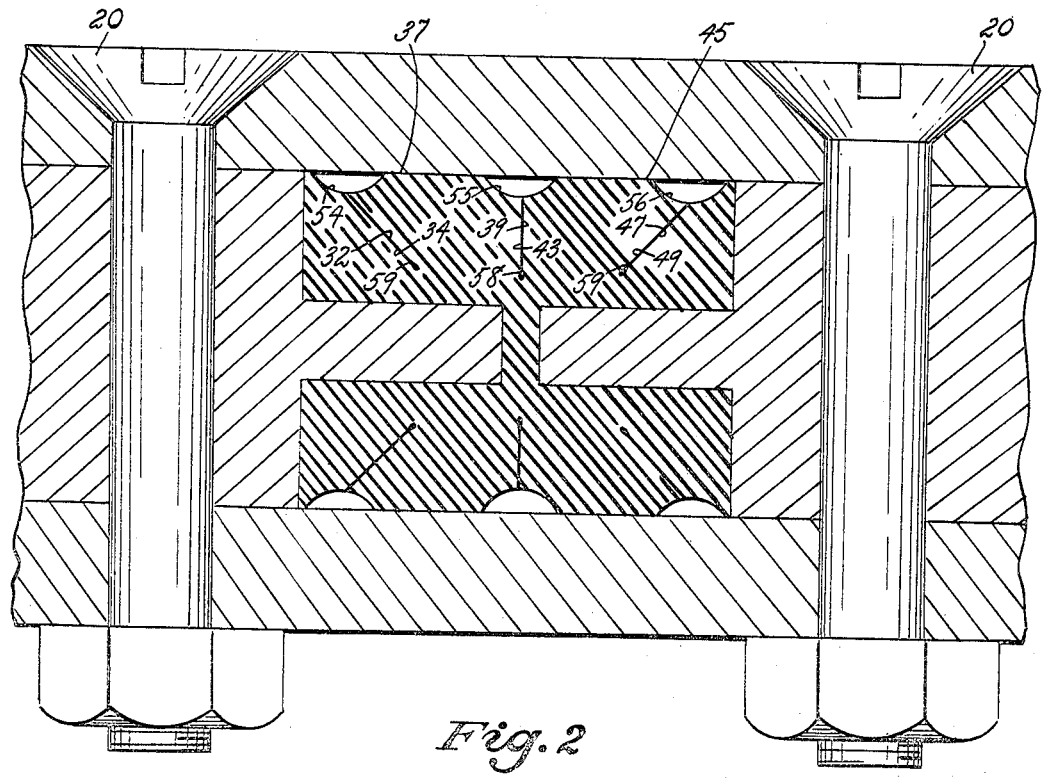
FIGURE 2 is a similar fragmentary sectional view showing the distortion of the fluid sealing element occurring upon compression of the same.

Referring to FIGURE 2 in the drawing, upon engagement of the element 12 with a surface to be sealed, the portions of the sealing element 18 projecting outwardly of the recess 15 are deformed to the configuration shown as the total volume of the element 18 is slightly less than that of the recess 15, the convex surfaces 37 and 45 are reduced to planar configuration to define first, second, and third voids 54, 55, and 56, respectively. Simultaneously, the surface 34 is distorted to come into contact with the surface 32, as indicated by the line 57. The surface 39 is brought to contact the surface 43 as indicated by the line 58, and the surfaces 47 and 49 similarly meet in the line 59. It will be observed that the distortion is confined entirely to the central portion of the element 18, there being practically no distortion of that portion of the element 18 disposed beneath the surfaces 32 and 49.

On the occurrence of the pressure differential, any distortion is imparted to either of the areas disposed between the lines 57 and 59. It is immediately transmitted to the entire volume of such area, and consequently strongly resisted. Under compression, the recess 15 is almost completely filled, and thus there is very little room for further flow of the element 18. It will be observed that the edges 35, 38, 44 and 46 do not disappear upon distortion, but rather remain in contact with the surface being sealed, so that pressure flow caused by the occurrence of a pressure differential does not easily obtain a footing on the now flattened surfaces 37 and 45, as is often the case in prior art devices.

I wish it to be understood that I do not consider the invention limited to the precise details of structure shown and set forth in this specification, for obvious modifications will occur to those skilled in the art to which the invention pertains.

I claim:

1. In a fluid sealing gasket, including a relatively rigid retaining body having a planar part-engaging surface, a recess extending into said body from said surface and a fluid sealing element within said recess, the improvement comprising: said recess being of a rectangular cross-sectional configuration including a bottom wall and oppositely disposed side walls, said fluid sealing element being of generally rectangular configuration and having corresponding bottom and side walls contacting those of said recess, and having an outwardly facing seal forming surface disposed between the upper edges of said recess, said last mentioned surface commencing at a first side edge, and including, serially, a first angularly disposed surface extending inwardly of said recess in a direction away from an adjacent side wall thereof, a first small outwardly facing curved surface, a planar surface substantially parallel to said side wall of said recess and extending outwardly of said recess, a first convex surface positioned to contact a surface being sealed, a second planar surface parallel to said first planar surface, a third planar surface perpendicular to said second planar surface and disposed within said recess, a fourth planar surface symmetrically disposed with respect to said second surface and parallel thereto, a second convex surface symmetrically positioned with respect to said first convex surface, a fifth planar surface symmetrically disposed with respect to said first planar surface and parallel thereto, a second small outwardly facing curved surface symmetrically disposed with respect to said first small outwardly facing curved surface, a second angularly disposed wall symmetrically positioned with respect to said first angularly disposed surface, and a second side edge; said third planar surface being positioned outwardly of a plane tangent to both said outwardly facing curved surfaces; the total volume of said fluid sealing element being less than that of said recess within which it is positioned.

References Cited

UNITED STATES PATENTS 2,513,178  6/1950  Jackson.
3,061,321  10/1962  Smith _____ 277—180

FOREIGN PATENTS 836,669  6/1960  Great Britain.

SAMUEL ROTHBERG, Primary Examiner

U.S. Cl. X.R.

277—211